(12) United States Patent
Dictos et al.

(10) Patent No.: US 9,152,466 B2
(45) Date of Patent: Oct. 6, 2015

(54) ORGANIZING FILE EVENTS BY THEIR HIERARCHICAL PATHS FOR MULTI-THREADED SYNCH AND PARALLEL ACCESS SYSTEM, APPARATUS, AND METHOD OF OPERATION

(71) Applicant: BARRACUDA NETWORKS, INC., Campbell, CA (US)

(72) Inventors: Jason Dictos, Ann Arbor, MI (US); Kyle John Hendricks, Ann Arbor, MI (US); Aaron Kluck, Ann Arbor, MI (US)

(73) Assignee: BARRACUDA NETWORKS, INC., Campbell, CA (US)

( * ) Notice: Subject to any disclaimer, the term of this patent is extended or adjusted under 35 U.S.C. 154(b) by 281 days.

(21) Appl. No.: 13/928,092

(22) Filed: Jun. 26, 2013

(65) Prior Publication Data

US 2014/0282585 A1    Sep. 18, 2014

Related U.S. Application Data

(60) Provisional application No. 61/778,429, filed on Mar. 13, 2013.

(51) Int. Cl.
*G06F 3/00* (2006.01)
*G06F 9/46* (2006.01)
*G06F 9/50* (2006.01)
*G06F 17/30* (2006.01)

(52) U.S. Cl.
CPC ........ *G06F 9/5027* (2013.01); *G06F 17/30224* (2013.01)

(58) Field of Classification Search
None
See application file for complete search history.

(56) References Cited

U.S. PATENT DOCUMENTS

| | | | | |
|---|---|---|---|---|
| 5,600,834 | A * | 2/1997 | Howard | 713/178 |
| 5,893,077 | A * | 4/1999 | Griffin | 705/34 |
| 7,213,040 | B1 * | 5/2007 | Stokes et | 1/1 |
| 2006/0129584 | A1 * | 6/2006 | Hoang et al. | 707/101 |
| 2007/0112714 | A1 * | 5/2007 | Fairweather | 706/46 |
| 2007/0220518 | A1 * | 9/2007 | Verbowski et al. | 718/102 |
| 2007/0233710 | A1 * | 10/2007 | Passey et al. | 707/100 |
| 2009/0138808 | A1 * | 5/2009 | Moromisato et al. | 715/758 |
| 2012/0102133 | A1 * | 4/2012 | Cao | 709/208 |

* cited by examiner

*Primary Examiner* — Adam Lee
(74) *Attorney, Agent, or Firm* — Duane Morris LLP; David T. Xue

(57) ABSTRACT

A cloud file event server transmits file events necessary to synchronize a file system of a file share client. A tree queue director circuit receives file events and stores each one into a tree data structure which represents the hierarchical paths of files within the file share client. An event normalization circuit sorts the file events stored at each node into sequential order and moots file events which do not have to be performed because a later file event makes them inconsequential. A thread scheduling circuit assigns a resource to perform file events at a first node in a hierarchical path before assigning one or more resources to a second node which is a child of the first node until interrupted by the tree queue director circuit or until all file events in the tree data structure have been performed.

5 Claims, 3 Drawing Sheets

ORGANIZING FILE EVENTS BY THEIR HIERARCHICAL PATHS FOR MULTI-THREADED SYNCH AND PARALLEL ACCESS SYSTEM, APPARATUS, AND METHOD OF OPERATION

RELATED APPLICATIONS

This non-provisional application claims priority from provisional application Ser. No. 61/778,429 filed 13 Mar. 2013 which is incorporated by reference in its entirety.

BACKGROUND

The present invention concerns backup and restore operations in a network based service, ie. a plurality of apparatus in a cloud coupled to agents controlling client processors. Because of network transmission of packets, the parts of files being restored do not necessarily arrive in convenient order and may be more efficiently delivered as bulk aggregations of parts from unrelated files.

Conventionally, a series of events is recorded in non/-transitory computer readable storage, in an embodiment, ADD, REMOVE, MODIFY, and RENAME. Each event has a watermark too, which requires committing in the watermark order, yet restoring the actual files to disk and retrieving the parts over a network doesn't necessarily have to be in the order of commitment.

Problem: How do you intelligently restore file events with threads controlling a processor, without having the threads conflict?

A cloud file event server is communicatively coupled through intermittent channels to a plurality of file share clients. The cloud file event server stores the superset of all files among the file share clients. Although in a degenerate case a client may have a set of files which are not shared with any other client, a common and more useful configuration occurs when there are a plurality of clients which share a set of files but which may be divergent from one another due to unilateral file events. These file events are uniquely watermarked and may be ordered in sequence. The conventional solution for resynchronizing a file share client with a cloud file event server is to download those file events missing from the file share client and transform the file system of the file share client in watermark order. The user experience however of single threaded operation could be improved.

What is needed is a way to use multi-threaded resources to transform a file system of a file share client without conflict, deadlock, file corruption, data loss, and with improved performance.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope.

SUMMARY OF THE INVENTION

Figure 1A:
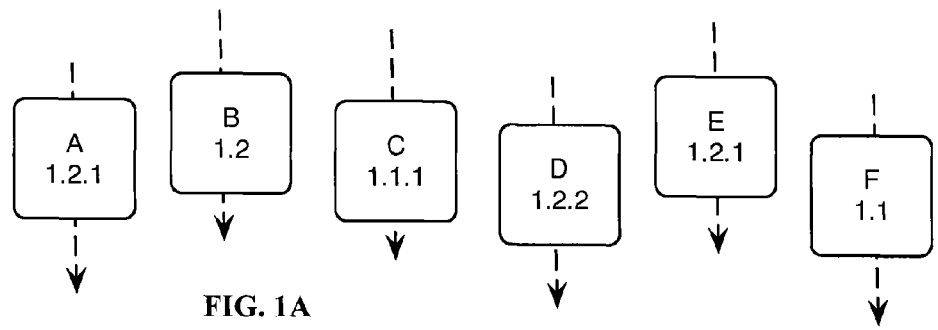
FIG. 1A is an illustration of a plurality of file events which add, modify, rename, and remove nodes in a file system.

A first file share client is communicatively coupled to a cloud file event server, and submits file event watermarks representing its current file system state. A cloud file event server transmits file events necessary to synchronize a file system of a file share client, when watermarks of file events previously stored at the file share client differ from watermarks of the same files stored on the cloud file event server.

A tree queue director circuit receives file events and stores each one into a location of a tree data structure in memory which represents the hierarchical paths of files within the file system of the file share client. The tree queue enables parallel assignment of resources to branches which are on independent hierarchical paths.

An event normalization circuit sorts the file events stored at each node of the tree data structure into sequential order and in reverse sequential order moots file events which are trumped by subsequent file events. Mooted file events are stored but do not have to be performed because a later file event makes them inconsequential. Deleting a file takes precedence over making modification to that file. Deleting a node takes precedence over other events at that node. Renaming has complex dependencies.

A thread scheduling circuit traverses to a first node in the event tree queue, reads all the non-mooted file events assigns a resource to perform the file events in sequential watermark order. After completion of the non-mooted file events at a first node in a hierarchical path, the thread scheduling circuit descends the hierarchy to assign one or more resources to a another node which is a child of the first node until interrupted by the tree queue director circuit or until all file events in the tree data structure have been performed. If additional resources are available, the thread scheduling circuit may assign a resource to a sibling of a child node.

Performing file events at a node is suspended when a new file event is received by the tree queue director until it can be determined if the new file event moots file events in the hierarchical path of the node.

An apparatus receives a plurality of file events and assigns the file events to threads. The file events may be applied to different files in parallel. The apparatus stores into memory the file events according to hierarchical path metadata for each file. File events which apply to a file in a hierarchical path are assigned to one thread. Scheduling of the file events by the thread depends on the relative watermark among the file events and the individual impact of each file event upon the file.

An apparatus coupled to a wide area network receives and applies a plurality of file events which are bounded between two serial watermarks. The file events are processed in parallel by multiple threads. A circuit assigns file events to threads by analysis of the hierarchical path metadata associated with each file. Each thread schedules execution by skipping over a first file event whose watermark precedes a watermark of a second file event which moots the effect of the first file event.

A multi-threaded method for restoring events without conflict organizes events into a hierarchical tree of nodes which can be parents, children, or both. Multiple events at a node are stacked and flattened as needed. Each node of events is restored after its parent node is restored.

A method for operation of the apparatus includes: storing into memory a tree of file events, organizing events into nodes by their paths; stacking each node with multiple events, and flattening as needed.

DETAILED DISCLOSURE OF EMBODIMENTS

The present invention increases the performance of synchronizing a plurality of file share clients (fsclients) with a cloud file event server (feserver) by parallelizing file events for a plurality of threads to transform the file systems of each fsclient. File events such as add and modify may be mooted by other subsequent file events such as remove or delete. A tree data structure enables non-conflicting file events to be segregated from one another and mutually interrelated file events to be normalized, ordered, flattened, or optimized for performance.

In an embodiment, a first file share client is communicatively coupled to a cloud file event server, and submits file event watermarks representing its current file system state. The cloud file event server may compare these watermarks with the file events to determine which files are out of synch and which file events need to be performed at the first file share client to synchronize the shared files.

A cloud file event server transmits file events necessary to synchronize a file system of a file share client, when watermarks of file events previously stored at the file share client differ from watermarks of the same files stored on the cloud file event server. In an embodiment, the cloud file event server may organize and optimize the file events for performance. In an embodiment, the file events are received at the file share client in uncontrolled order because of the latency of a network or the latency of the file systems of the cloud file event server. In other words, if file events which apply to multiple files are being transmitted and received, they may not be well ordered.

A tree queue director circuit receives file events and stores each one into a location of a tree data structure in memory which represents the hierarchical paths of files within the file system of the file share client. The tree data structure may be created as file events are received or may be created by reading the file system of the client when watermarks are uploaded to the cloud file event server. The file events are not performed as they are received but accumulated at nodes of the tree data structure for normalization. The tree queue director circuit remains active to receive additional file events from the cloud file event server and suspends other processing when additional file events are received because a new file event may moot many yet unperformed file events in the tree queue.

An event normalization circuit sorts the file events stored at each node of the tree data structure into sequential order and in reverse sequential order moots file events which are trumped by subsequent file events. Mooted file events are stored but do not have to be performed because a later file event makes them inconsequential. Branches to a hierarchical path may be added, modified, or removed by file events. In an embodiment, file events are ordered as they are stored into the tree data structure and earlier file events may be marked as moot when certain subsequent file events are stored.

A thread scheduling circuit assigns a resource to perform file events at a first node in a hierarchical path before assigning one or more resources to a second node which is a child of the first node until interrupted by the tree queue director circuit or until all file events in the tree data structure have been performed. As soon as file events at a node have been performed, additional threads may be added (up to the optimal number for a processor) to operate on parallel branches. The lowest level of the tree queue, closest to root, is always processed first when new file events are received from the cloud file event server.

A method of operation for a file share client includes the processes: generating a tree data structure which reflects the hierarchical path name of every file in the file system; transmitting at least one watermark to a cloud file event server; receiving one or more file events and storing each file event into the tree data structure at a node; normalizing the file events stored at the node; assigning a resource to transform a file system by performing the file events at a first node which is lower in the tree queue before assigning any resource to perform file events at a second node which is descended from the first node in the hierarchy.

Normalizing means determining the order in which file events should be performed and marking some file events as moot if the result of performing them would be inconsequential in light of another file event.

To resynch a client on a network with a cloud service, it is desirable to receive all file events between a first watermark and a second watermark. Some file events with a first watermark may be mooted by another file event with a later watermark. Both need to be assigned to the same thread to accomplish this.

Storing this tree in computer memory solves the ordering problem, as it is completely safe to restore a node of events provided the parent node was processed first. We herein disclose a method which improves file event restore using threads.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Referring to FIG. 1A, a processor (not shown) coupled to non-transitory computer readable storage is adapted to operate on a plurality of events, which as shown in the illustration of FIG. 1A from left to right are stored each with a serial watermark A, B, . . . F.

The processor determines that each event has to do with a level in a hierarchy 1.0, 1.1 1.1.1 and mostly are dependent on a parent (except for the root or roots). In some cases there are children which are peers in the levelized hierarchy e.g. 1.2.1 and 1.2.2 both depend on 1.2 but not on each other enabling parallel execution without conflict. Note that File Events A and E occur in different nodes at the same level of hierarchy. Thus A and E cannot be safely assigned to parallel threads and evaluated until after Event B at node 1.2 is evaluated. Node 1.2.2 has two file events A and E which are stacked according to their serialized watermark and evaluated in that order. In an embodiment, when node 1.2 is completely evaluated, it spawns an additional thread because there are two siblings which may be evaluated in parallel. To simplify the illustration however we show an embodiment where node 1.2.2 evaluations are assigned to Red Thread because node 1.1.1 has no children.

A first process controlling the processor assigns events F, C, D, B, A, E to nodes in a hierarchy encoded in non-transitory storage. Nodes to the left are parents of nodes to the right in this graphic and must be predecessors in evaluation. The processor is constrained to not evaluate nodes to the right until their predecessor node to the left are evaluated.

A second process assigns nodes to threads as follows: each thread evaluates events within a node in serial order e.g. A followed by E; when a parent node is completely evaluated (1.0), the method determines the condition that there are a plurality of sibling nodes which can be evaluated in parallel, the processor spawns additional threads (e.g. Green) up to a maximum number of threads, when there are siblings which can be evaluated in parallel; when an incoming event is received which affects a parent, the threads which depend on the parent are suspended until the parent is resolved or simply aborted.

Figure 1B:
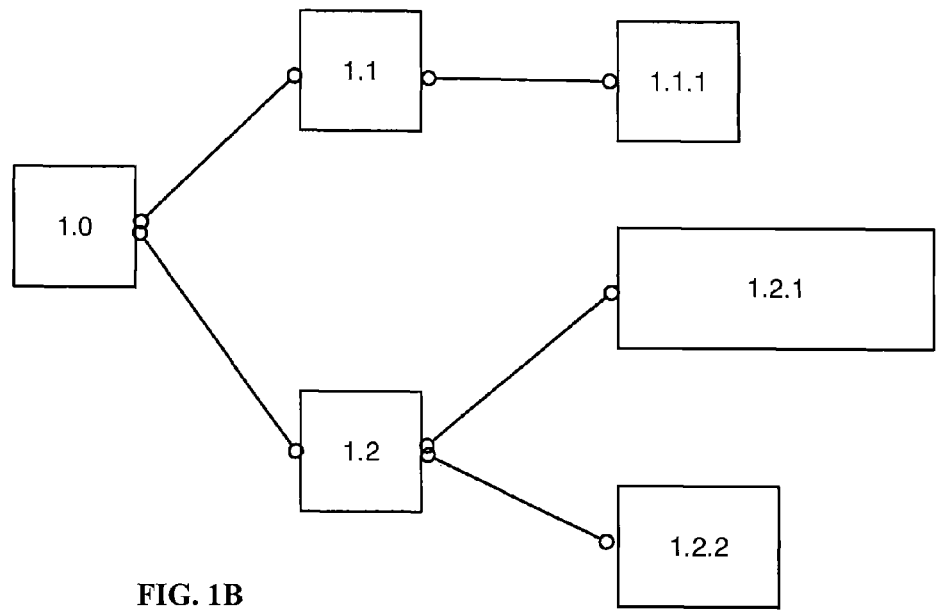
FIG. 1B shows the arriving file events are received and stored into a tree queue.
Figure 1C:
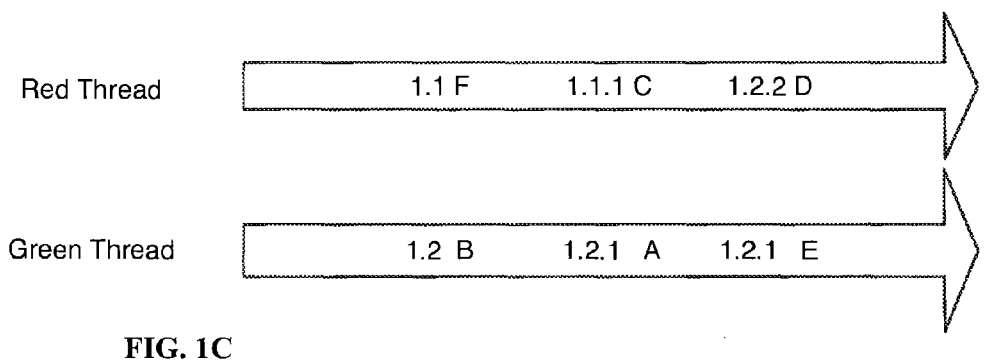
FIG. 1C shows the desired assignment of file events to the resources which support multiple threads.

FIG. 1A is an illustration of a plurality of file events which add, modify, rename, and remove nodes in a file system. Nodes may be files or directories of files. The file events may arrive in any order and are not grouped but contain the hierarchical path of the node. In FIG. 1B the arriving file events are received and stored into a tree queue which is a data structure in memory which follows the file system of the client. In this example, only two file events A and E apply to the same node. Not shown is a normalization step which recognizes that the watermark of A precedes the watermark of E. In an embodiment, file event A could be marked as moot if the subsequent file event E makes A inconsequential. In FIG. 1C is shown the desired assignment of file events to the resources which support two threads, Red and Green. Note that file events that apply to nodes closest to the root are performed before file events that apply to nodes which descend from them. Thus the invention is not a conventional FIFO queue nor a conventional LIFO stack.

Figure 2:
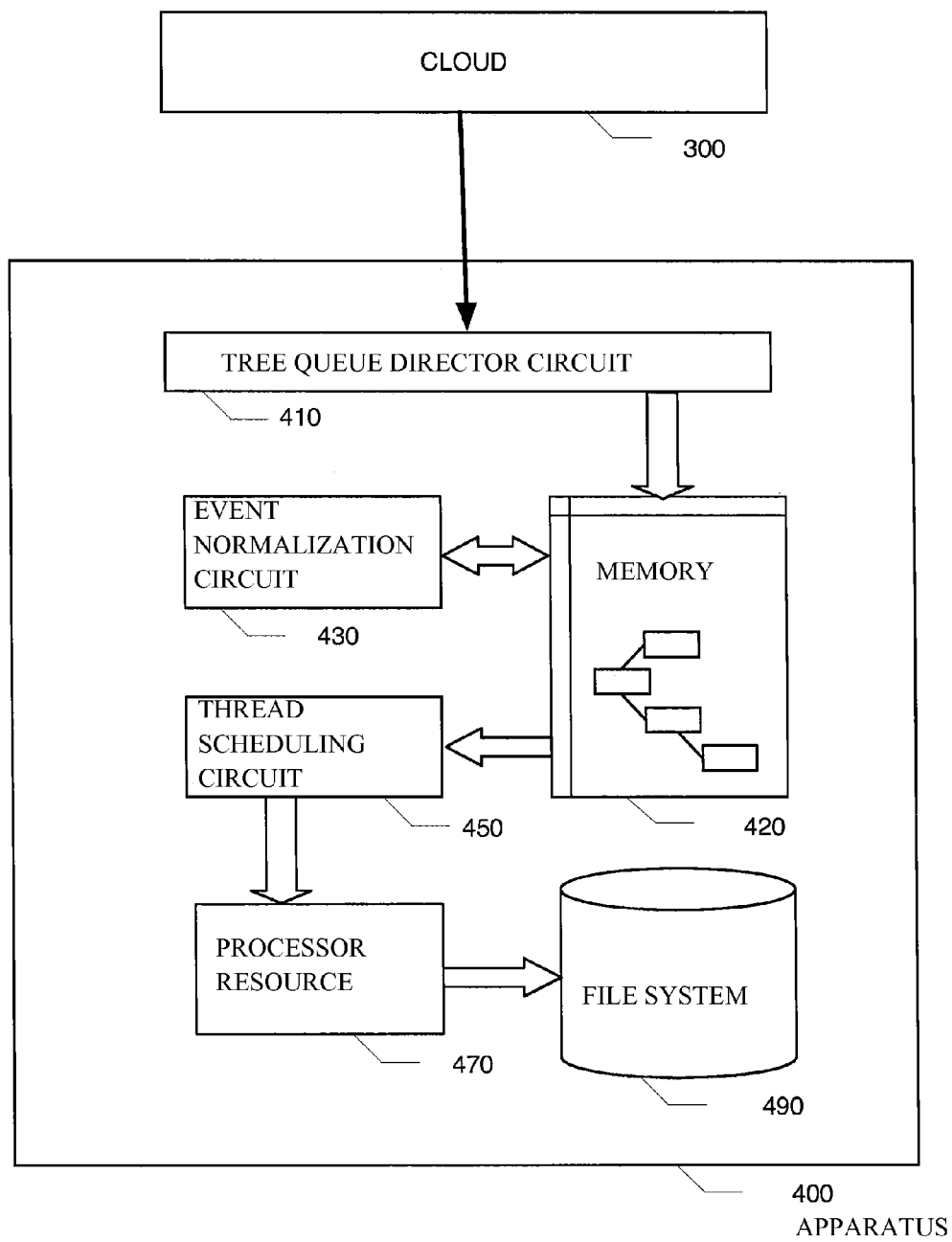
FIG. 2 is a system and apparatus block diagram with components called out and data flows and connections between the components.

FIG. 2 provides a system and apparatus block diagram with data flows. Apparatus 400 is communicatively coupled to a cloud server 300 which transmits a plurality of file events. A tree queue director circuit 410 receives the file events and stores each one into a tree data structure in memory 420 to which it is coupled. The locations or nodes in the tree data structure represent the hierarchical paths of the file system of the apparatus 490. An event normalization circuit 430 is coupled to the memory 420 and determines the order of file event performance at each node according to its watermark. In an embodiment, the event normalization circuit marks certain file events as moot because a later watermarked file event makes the earlier file event inconsequential. The event normalization circuit may operate on file events as soon as they are stored into the tree data structure and sleeps when completed until more file events are stored by the tree queue director circuit. A newly arrived file event may cause the event normalization circuit to moot all file events at a child node if its parent node removes the child. Whenever the event normalization circuit quiesces, a thread scheduling circuit 450 which is coupled to the memory 420 and further coupled to processor resource 470 reexamines the tree queue beginning from the root and proceeding into the hierarchy to assign file events at a node to a thread within the processor resource 470. The processing resource 470 is further coupled to the file system 490 and its threads perform the file events to transform the file system.

Figure 3:
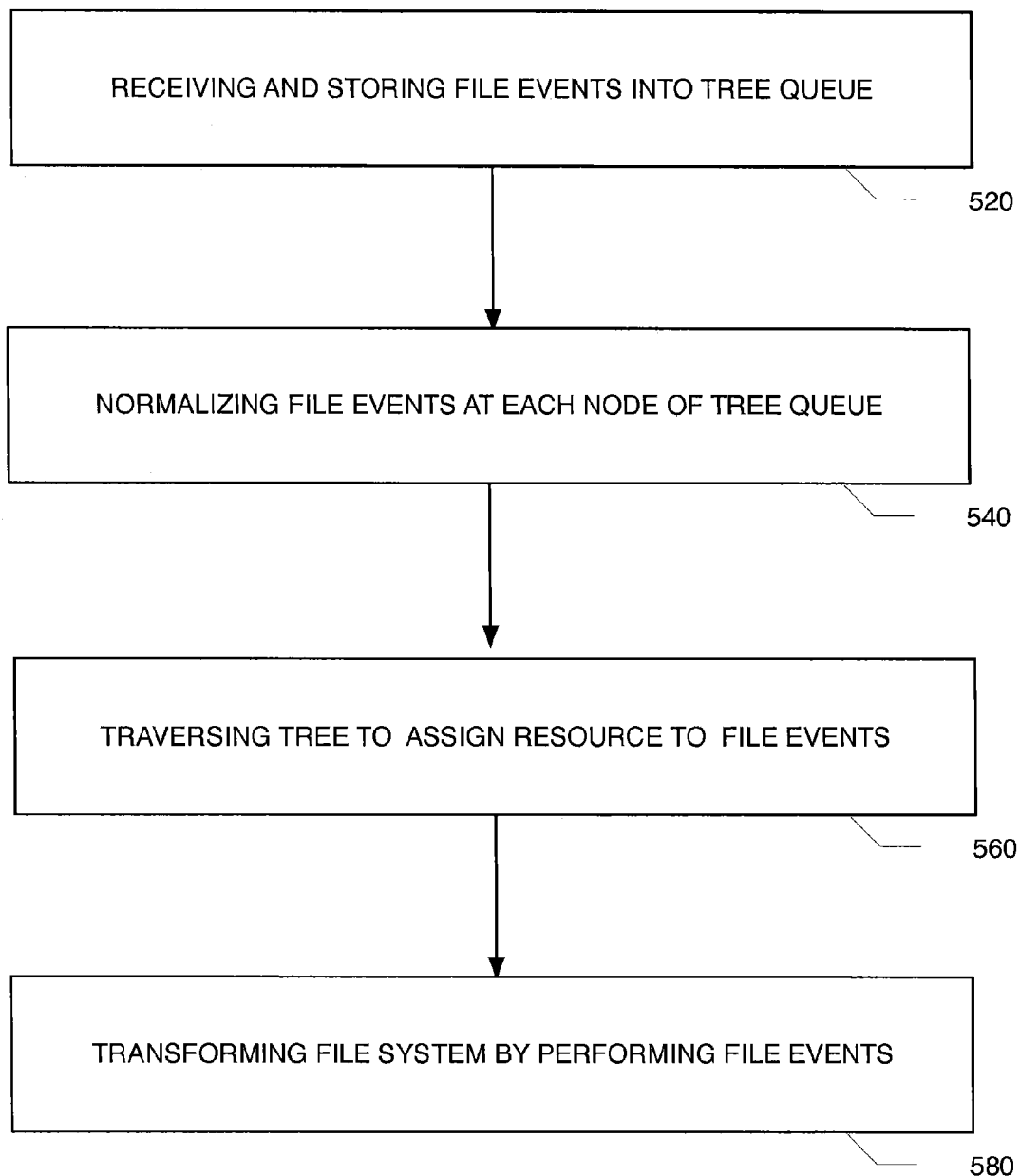
FIG. 3 is a flow chart of processes that make up the method.

FIG. 3 is a flow chart of the processes in the method of operating the inventive apparatus. It is understood the several of these processes may operate in parallel or overlapped in time. It is not necessary that one complete before another can initiate. They may be performed asynchronously which is an advantage of this claimed invention. Process 520 continuously receives and stores file events into a tree queue which is a data structure in memory. Communication with a cloud server may be intermittent and when ever it is established, the apparatus may upload one or more watermarks to reflect its current file state which may elicit transmission of one or more file events from the cloud. As file events are received, each one is stored into a location or node of the tree queue. Process 540 operates on the file events at each node when a new file event is stored into that location. It may overlap operation with process 520 and quiesce until new file events are received and stored. Normalizing file events is first determining the order in which they may be performed according to their watermarks. In an embodiment, normalizing further includes marking a certain first file event as moot when it can be determined that performing a second file event with a later watermark would make the effect of the first file event inconsequential. Whenever process 540 quiesces, process 560 traverses the tree queue beginning with the root and proceeds to dependent (child) nodes to assign a resource to perform file events. As many threads as a resource can efficiently support are scheduled for process 580, transforming the file system which may include adding, modifying, renaming, and deleting files and the directories which include the files. The beneficial effect of the claimed invention is due to mooting unnecessary file events and applying the remaining file events in parallel using a plurality of threads without contention.

One aspect of the invention is a method for operation of an apparatus the processes including: receiving and storing file events into a tree queue data structure encoded in a non-transitory data store; normalizing file events at each node of the tree queue, wherein normalizing comprises sorting the file events by watermark; traversing the tree queue from the root of the tree to assign file event processing resources to file events stored in nodes of different branches of the tree queue in a plurality of threads; and transforming a file system by performing file events by parallel threads.

In an embodiment, normalizing file events at each node of the tree queue further includes: marking a certain first file event as moot when a file event with subsequent watermark would cause the certain first file event to be inconsequential. In embodiments, normalization includes:

Multiple modifies can be flattened into one modify
Multiple adds can be flatted into one add
Multiple adds and modifies can be flattened into 1 add
A remove will flatten all child nodes and peer events at its node
An remove and add (in that order) will flatten into a modify Another aspect of the invention is a method for operation of a client apparatus having a file system, which includes several processes: receiving and storing file events into a tree queue data structure encoded in a non-transitory data store; normalizing file events at each node of the tree queue, wherein normalizing comprises ordering the file events according to watermark and marking as moot file events which would be inconsequential by a later file event; assigning file event processing resources to file events stored in nodes of different branches of the tree queue in a plurality of threads; and transforming a file system by performing file events by parallel threads.

In an embodiment, assigning file event processing resources further includes: traversing to a level of the tree queue closest to a root; assigning file event processing resources to a thread for performance of normalized file events at the node of the tree queue; and upon completion, examining one or more child nodes of the node for file events; and assigning a plurality of threads of a processing resource to file events stored in separate child nodes up to the number of threads efficiently supported.

Another aspect of the invention is a system which has a client apparatus, and non-transitory storage on which is encoded instructions which when executed cause the apparatus to receive and store file events into a tree queue, normalize file events at nodes of the tree queue, schedule file event processing resources, and transform a file system;

wherein the apparatus has: a network interface circuit; coupled to a tree queue director (tqd) circuit; coupled to a memory device; coupled to an event normalization circuit; the memory device further coupled to a thread scheduling circuit; the thread scheduling circuit coupled to a file event processing resource; coupled to a file system.

In an embodiment, the event normalization circuit sorts file events stored at each node of the tree queue stored in the memory device by a watermark and marks file events as moot when it can determine the file events to be inconsequential.

In an embodiment, the thread scheduling circuit reexamines the earliest parent node of tree queue data structure stored in the memory device when a new file event is stored into it, schedules a resource to perform the file events at the earliest parent node and subsequently examines child nodes of the parent to schedule one or more resources to perform the file events at a first child nodes in parallel with file events at a second child node.

In an embodiment, the system further includes: a cloud file event server communicatively coupled to the client apparatus to receive a watermark to characterize a file state of the client apparatus and to transmit at least one file event to synchronize the file state of the client apparatus with a file state of the cloud file event server.

Another aspect of the invention is an apparatus coupled to a wide area network which includes: a circuit to receive a plurality of file events which are bounded between two serial watermarks; a processor enabled to apply a plurality of file events in parallel by multiple threads; a memory store to receive file events assigned to nodes; an assignment circuit to assign file events to nodes by analysis of the hierarchical path metadata associated with each file event; for each thread enabled by the processor, a scheduling circuit to schedule execution of file events by skipping over a first file event whose watermark precedes a watermark of a second file event which moots the effect of the first file event.

Another aspect of the invention is a multi-threaded method for restoring events without conflict comprising: organizing file events into a hierarchical tree of nodes written into a non-transitory store; traversing the hierarchical tree to schedule all of the nodes which can be parents, children, or both; and stacking or flattening multiple events at each node.

Another aspect of the invention is a method at a workstation coupled to a server, the workstation having a processor and a plurality of files organized in hierarchical paths, the method comprising: receiving from the server a plurality of file events; storing the file events into an event store according to the hierarchical path metadata of each file event; spawning a first work thread for the processor to apply file events to files associated with a root node of the hierarchical path; on the condition that the thread is successful at locking the node, executing all file events at the node in order; spawning one or more second work threads for each direct child of the root node; on the condition that a second work thread is successful at locking the child of the root node, executing all file events at the node in order; and until no more nodes are found, generating additional work threads and executing file events.

CONCLUSION

The method of operation can easily be distinguished from executing file event instructions at a processor of an apparatus in sequential order according to their respective watermarks. The method prevents one file event from blocking all other file events which do not depend on it. The method of operation can be distinguished by the optimization strategy of applying file events in watermark order unless an instruction having a later watermark obviates an instruction having an earlier watermark.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple communicatively coupled sites.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and I or the processor I special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operation of a client apparatus having a file system, the method comprising:
   receiving and storing file events into a tree queue data structure encoded in a non-transitory data store;
   normalizing file events at each node of the tree queue, wherein normalizing comprises ordering the file events according to a watermark of each file event and marking as moot file events which would be inconsequential by a later file event;

assigning file event processing resources to file events stored in nodes of different branches of the tree queue in a plurality of threads;

traversing to a level of the tree queue closest to the root;

assigning file event processing resources to a thread for performance of normalized file events at the node of the tree queue closest to the root; and upon completion, examining one or more child nodes of the node for file events;

assigning a plurality of threads of a processing resource to file events stored in the one or more child nodes up to a predetermined number of threads supported by the processing resource; and transforming a file system by performing file events by parallel threads.

2. A system comprising a client apparatus, and non-transitory storage on which is encoded instructions which when executed cause the apparatus to receive and store file events into a tree queue, normalize file events at nodes of the tree queue, schedule file event processing resources, and transform a file system;

the apparatus comprising:
- a network interface circuit; coupled to a
- tree queue director (tqd) circuit; coupled to a
- memory device; coupled to
- an event normalization circuit; the memory device further coupled to
- a thread scheduling circuit; the thread scheduling circuit coupled to
- a file event processing resource; coupled to
- a file system, wherein the thread scheduling circuit reexamines the earliest parent node of a tree queue data structure stored in the memory device when a new file event is stored into it, schedules a resource to perform the file events at the earliest parent node and subsequently examines child nodes of the parent to schedule one or more resources to perform the file events at a first child node in parallel with file events at a second child node.

3. The system of claim 2 wherein the event normalization circuit sorts file events stored at each node of the tree queue stored in the memory device by a watermark and marks file events as moot when it can determine the events to be inconsequential.

4. The system of claim 2 further comprising: a cloud file event server communicatively coupled to the client apparatus to receive a watermark to characterize a file state of the client apparatus and to transmit at least one file event to synchronize the file state of the client apparatus with a file state of the cloud file event server.

5. A method at a workstation coupled to a server, the workstation having a processor and a plurality of files organized in hierarchical paths, the method comprising:

receiving from the server a plurality of file events;

storing the file events into an event store according to the hierarchical path metadata of each file event;

spawning a first work thread for the processor to apply file events to files associated with a root node of the hierarchical path;

on the condition that the thread is successful at locking the node, executing all file events at the node in order according to the hierarchical path metadata of each file event;

spawning one or more second work threads for each direct child of the root node;

on the condition that a second work thread is successful at locking the child of the root node, executing all file events at the node in order according to the hierarchical path metadata of each file event; and until no more nodes are found, generating additional work threads and executing file events.

* * * * *